United States Patent Office 3,312,077
Patented Apr. 4, 1967

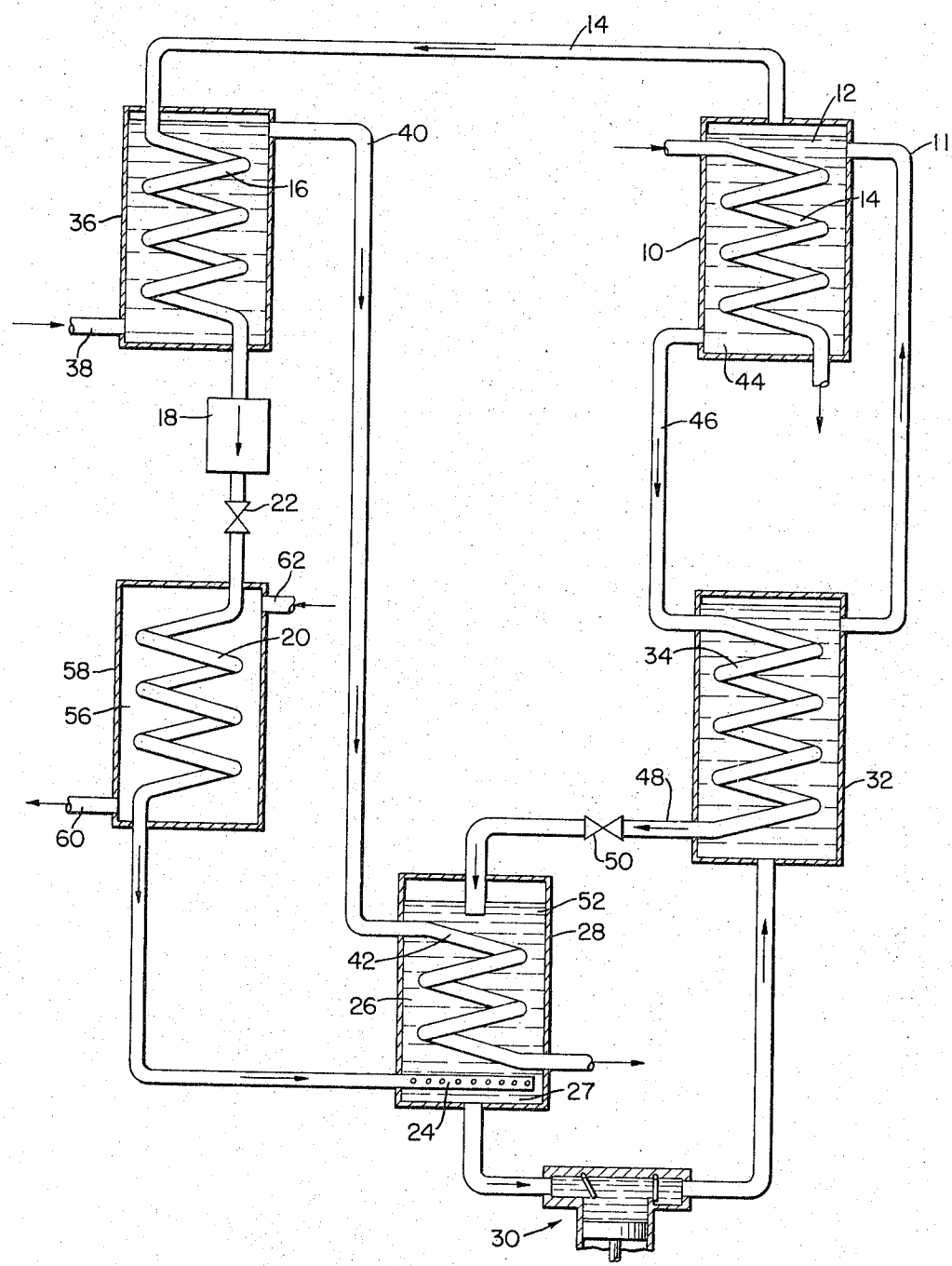

3,312,077
ABSORPTION REFRIGERATION SYSTEM
William L. McHale, Broomall, Svend E. Sorensen, King of Prussia, and James J. O'Connor, Norristown, Pa., assignors to Robertshaw Controls Company, Richmond, Va., a corporation of Delaware
Filed Mar. 17, 1964, Ser. No. 352,475
3 Claims. (Cl. 62—112)

According to this invention, a lithium iodide-ammonia solution is used as the absorbent and ammonia is used as the refrigerant in an absorption refrigeration system.

This combination has been found to be very effective when used in liquid absorption refrigeration systems, such as in systems of the substantially continuous refrigeration type.

For example, this combination may be used in a refrigeration system of the character shown in the accompanying drawings.

In the drawings, the figure is a diagrammatic representation of a typical liquid absorption refrigeration system of the substantially contiuous type in which the absorbent and refrigerant of this invention may be advantageously used.

While one type of system has been illustrated, other systems may be used.

In the sole figure of the drawing, a refrigerant generator or generator means 10 may be supplied by pipe 11 with a strong solution of lithium iodide and ammonia as indicated at 12. This solution contains no water and may contain substantially only or mainly lithium iodide and ammonia. This strong solution is heated by any suitable heating medium such as in heating pipe 14. This causes substantially pure ammonia vapor to be discharged along the vapor flow means or pipe 14 to the condenser tube 16.

The ammonia is cooled and condensed in the condenser means or tube 16 into liquid form which flows into a liquid refrigerant receiver 18. This receiver acts as a capacitor to maintain an adequate supply of liquid refrigerant for varying demands during the operation of the system.

Because of the very great spread between the boiling points of lithium iodide and of ammonia, the advantages of which have heretofore been unrealized in connection with refrigeration, only substantially pure ammonia is distilled from the solution in the generator 10 into the condenser 16 where substantially uncontaminated liquid ammonia is condensed. The boiling point of ammonia under standard conditions is −33.35° C. and the boiling point of lithium iodide is 1190° C.

In previous water-ammonia refrigerating systems, wherein water or a water solution containing a salt or the like and ammonia is the absorbent, and ammonia is the refrigerant, on the other hand, the refrigerant generator has discharged water vapor along with the ammonia vapor into the condenser, which causes harmful effects in the refrigerating system.

The pure liquid ammonia, according to this invention, may then be discharged into the evaporator means 20 through an expansion valve 22 which reduces the pressure of the ammonia as it is discharged into evaporator 20. The pressure of the ammonia is reduced sufficiently to cause it to evaporate into vapor at temperatures sufficiently low to produce the desired refrigerating effect on the substance to be refrigerated. No water is frozen in the evaporator of this invention.

The ammonia pressure in evaporator 20 of this invention may be reduced to produce freezing temperatures far below 0° F. while the pressure of the ammonia is still above atmospheric pressure. This permits the use of a relatively simple evaporator.

In the case of water-ammonia systems, the water vapor has been distilled out of the generator into the condenser where the water vapor has been condensed and from which it has been carried into the evaporator. There the condensed water has been frozen by the low temperatures produced in the evaporator. This has affected the operation of the evaporator adversely, and often has caused the evaporator to become inoperative.

According to this invention, evaporated ammonia vapor may then flow from the evaporator 20 through a vapor flow means or pipe into the distributing means or perforated pipe 24 where it may bubble or otherwise mix with the lithium iodide-ammonia solution 26 in the absorber means 28.

The ammonia vapor from pipe 24 is absorbed in the lithium iodide-ammonia solution and produces a strong solution in the lower part 27 of the absorber 28.

It has also been realized for the first time in connection with refrigeration that a solution of lithium iodide and ammonia lowers the vapor pressure of ammonia drastically. For example, at 18° C. the vapor pressure of ammonia is lowered from 7.93 atmospheres to 0.0068 atmosphere. This permits smaller equipment and reduces the heat input per ton of refrigeration produced.

The strong solution from the lower part 27 of the absorber 28 is then pumped by pump 30 into the heat exchanger 32 where the strong solution is heated by exchanging heat with hot weak solution which flows downwardly through pipe coil 34 from the generator 10.

Proper heat exchanges take place in the system.

For example, cooling water may be used to cool the condenser 16. This water may enter the condenser jacket 36 at 38 and leave at pipe 40. This water, if still sufficiently cool, may flow down through the coil 42 to cool the absorber 28. However, fresh cooling water may be added or substituted to cool the absorber, if the water in pipe 40 is not sufficiently cool.

When the generator is heated, as by steam or other heating medium in pipe 14, the strong solution in the upper part 12 of the generator is weakened by the evaporation of ammonia and flows or gravitates downwardly in heated condition to the bottom 44 of the generator casing 10.

The hot weak solution from 44 then flows through pipe 46 to coil 34 to heat the strong solution in interchanger 32.

The cooled weak solution from coil 34 flows through pipe 48 and regulating valve 50 to deliver it to the top 52 of the absorber 28.

The evaporator 20 may cool a refrigerated space directly if desired. It may also cool brine 56 in the evaporator jacket 58. This brine may be conducted through a pipe 60 to the refrigerated space, and such brine may return through pipe 62.

Advantages of this invention over a water absorbent-ammonia refrigerant system have been pointed out.

It has been suggested that analizers, rectifiers, separators, etc., be added to the water-ammonia systems such as at pipe 14, etc., to prevent the distillation of water vapor from the generator into the condenser. However, such devices have been only partially successful and they have added to the cost of the equipment.

There are advantages of this invention over other systems.

For example, it has been suggested that an aqueous lithium bromide or chloride solution may be used as the absorbent and water may be used as the refrigerant in an absorption system. In these systems, a vacuum must be maintained in the evaporator in order to evaporate the refrigerant (water) at a sufficiently low temperature to produce any useful refrigeration. In fact, the evaporating temperature has a lower limit in the neighborhood of 32° F. which is the freezing temperature of water. Any lower evaporating temperature renders this system inoperative. In the system of this invention no such temperature lower limit is present.

It is thus to be seen that new, useful refrigerating systems and methods have been produced by this invention. Also, such systems and methods are very desirable and advantageous. A new, useful and very desirable and advantageous refrigerating medium has also been provided.

Refrigeration apparatus and methods may be decreased in cost and increased in efficiency by the practice of this invention.

While the form of the invention now preferred has been disclosed, as required by statute, other forms may be used, all coming within the claimed subject matter which follows.

What is claimed is:
1. A method comprising, evaporating relatively low boiling point substantially pure ammonia vapor from a hot strong liquid solution of mainly high boiling point lithium iodide and low boiling point ammonia and wherein the vapor pressure of said ammonia is drastically reduced, condensing said ammonia vapor into ammonia liquid, evaporating said ammonia liquid at reduced pressure into ammonia vapor and absorbing said vapor in a cool weak liquid solution of lithium iodide and ammonia at said reduced pressure to produce a relatively strong liquid solution of lithium iodide and ammonia, and discharging said relatively liquid strong solution to and mixing it with said first named solution.

2. A refrigerating apparatus comprising, a generator containing a hot strong liquid solution of mainly lithium iodide and ammonia as the absorbent and generating substantially pure ammonia vapor from said solution, a condenser receiving said ammonia vapor from said generator, and condensing such vapor into liquid ammonia, an evaporator receiving said liquid ammonia from said condenser and evaporating said liquid at reduced pressure into ammonia vapor, an absorber receiving said last named vapor and absorbing it in a cool weak solution of mainly lithium iodide and ammonia, and forwarding said last named solution and mixing it with said first named solution.

3. Apparatus according to claim 2, in which apparatus an ammonia vapor flow means is provided between said generator and said condenser which is free of analizers, rectifiers, and separators.

References Cited by the Examiner
UNITED STATES PATENTS 2,041,741   5/1936   Bichowsky _____ 62—112
2,365,797  12/1944  Bichowsky _____ 62—494

ROBERT A. O'LEARY, *Primary Examiner.*